(12) United States Patent
Tran et al.

(10) Patent No.: US 9,189,695 B2
(45) Date of Patent: Nov. 17, 2015

(54) VECTOR TEXTURING FOR FREE-FORM DRAWING

(71) Applicant: Prime Circa, Inc., Lakeville, MN (US)

(72) Inventors: Viet Tran, Irvine, CA (US); Xuyen Tran, Ho Chi Mlnh (VN)

(73) Assignee: Prime Circa, Inc., Lakeville, MN (US)

( * ) Notice: Subject to any disclaimer, the term of this patent is extended or adjusted under 35 U.S.C. 154(b) by 0 days.

(21) Appl. No.: 14/293,095

(22) Filed: Jun. 2, 2014

(65) Prior Publication Data

US 2014/0355884 A1    Dec. 4, 2014

Related U.S. Application Data

(60) Provisional application No. 61/830,836, filed on Jun. 4, 2013.

(51) Int. Cl.
*G06K 9/00* (2006.01)
*G06K 9/18* (2006.01)
*G06T 11/20* (2006.01)

(52) U.S. Cl.
CPC ............... *G06K 9/18* (2013.01); *G06T 11/203* (2013.01)

(58) Field of Classification Search
CPC . G06K 9/18; G06K 9/00154; G06K 9/00161; G06K 9/00174; G06K 9/00167; G06K 9/00402; G06K 9/00852; G06K 9/00859; G06K 9/00865; G06K 9/00872; G06K 9/00879; G06T 11/203; G06F 17/30784
See application file for complete search history.

(56) References Cited

U.S. PATENT DOCUMENTS

2011/0310026 A1\* 12/2011 Davis et al. ................... 345/173
2014/0033134 A1\*  1/2014 Pimmel et al. ................ 715/863

FOREIGN PATENT DOCUMENTS

| EP | 1950705 | 7/2008 |
| WO | 2012103794 | 8/2012 |

OTHER PUBLICATIONS

International Search Report and Written Opinion for related PCT Application No. PCT/US2014/040451, mailed Oct. 8, 2014 (7 pages).

\* cited by examiner

*Primary Examiner* — Brian Le
(74) *Attorney, Agent, or Firm* — Winthrop & Weinstine, P.A.

(57) ABSTRACT

Systems and methods for applying a vector texture to free-form drawing, writing, etc., and more particularly, for rendering a vector texture to touch-based, free-form drawing, writing, etc.

11 Claims, 6 Drawing Sheets

VECTOR TEXTURING FOR FREE-FORM DRAWING

FIELD OF THE INVENTION

The present disclosure relates to vector texturing for free-form drawing. Particularly, the present disclosure relates to applying a vector texture to free-form drawing, writing, etc. More particularly, the present disclosure relates to rendering a vector texture to touch-based, free-form drawing, writing, etc.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Pixel-based graphics, more commonly known as bitmap graphics are made by the combination or blend of tiny pixels on a grid or lattice. The quality of a bitmap image depends largely on the density of the pixels, conventionally referred to as dots per inch (dpi) or pixels per inch (ppi). Generally, the higher the density, the better quality of the image. Pixel-based graphics do not, however, behave desirably when scaled to a larger size. Particularly, scaling up results in a distorted and/or splotchy image of poor quality.

Vector graphics use geometrical primitives, such as points, lines, curves, and shapes or polygons to represent images having a basis in mathematical expressions or functions. Unlike pixel graphics, vector graphics are more easily scalable to any size without losing quality, since the image changes size through geometrical equations.

In present times, where electronic and mobile devices are becoming the norm, and more and more day-to-day tasks, such as but not limited to, note-taking, typing, sketching, etc. are being performed via mobile, handheld, electronic devices, there has been an increased need for quality zooming functionality in order to fully take advantage of the capabilities of such relatively smaller-screened handheld electronic devices. However, where pixel graphics are utilized, such zooming causes the images to scale poorly, resulting in distorted and/or splotchy images of poor quality. Accordingly, there is a need in the art for vector texturing for free-form drawing. Particularly, there is a need for applying a vector texture to free-form drawing, writing, etc., that can be utilized, for example, in web-based and mobile-based applications operating on electronic and mobile devices. More particularly, there is a need for rendering a vector texture to touch-based, free-form drawing, writing, etc., such as but not limited to, the free-form drawing that may be performed on a mobile, handheld, electronic device using the user's finger(s), a stylus, or other like writing tool, that may be scaled substantially without distortion.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a system for applying vector-based texturing to free-form digital input. The system may include an input interface for receiving free-form digital input through a touch-based display screen, a module for performing vector analysis on the free-form digital input, including an analysis to provide vector-based texturing to the free-form digital input, and an output interface for rendering on the touch-based display screen a vector-based graphical image representative of the received input based on the vector analysis. The free-form digital input may be, but need not be, input relating to a stroke across the touch-based display screen of a user's finger or a stylus device. The module for performing vector analysis may include a stroke width module for calculating a width for the stroke. The stroke width module may calculate the width for the stroke based at least in part on a speed at which the stroke was made across the touch-based display screen. In one embodiment, a speed at which the stroke was made across the touch-based display may include determining the speed of the stroke at various points along the stroke by determining a plurality of touchpoints along the stroke separated by a predetermined time interval and calculating the speed of the stroke at a given touchpoint based at least in part on a function of the distance between that touchpoint and a predecessor touchpoint. In some embodiments, the width for the stroke at various touchpoints in a sequence of touchpoints taken along the stroke at predetermined time intervals is determined for each touchpoint according to predetermined expressions. The width for the stroke at various touchpoints in a sequence of touchpoints taken along the stroke at predetermined time intervals may likewise be determined for each touchpoint according to predetermined expressions. In further embodiments, the module for performing vector analysis may also include a stroke wetness module for calculating how wet a rendered stroke would appear. The module for performing vector analysis, in still further embodiments, may include a module for constructing a stroke skeleton that connects the plurality of touchpoints using one or more Bézier curves to produce a Bézier spline through the touchpoints. The module for performing vector analysis may further include a module for constructing a stroke contour based on the stroke skeleton that determines, for each of the plurality of touchpoints, a corresponding left point $L_i$ some distance away from the stroke skeleton on a first side of the stroke skeleton and a corresponding right point $R_i$ some distance away from the stroke skeleton on a second side of the stroke skeleton and constructs a stroke contour connecting all of the left and right points of the plurality of touchpoints. The distance that the left point and right point corresponding to a given touchpoint are away from the stroke skeleton may be based at least in part on a stroke width calculated for that touchpoint based at least in part on the speed of the stroke at that touchpoint. In a particular embodiment, the left and right points for each touchpoint in a sequence of touchpoints may be determined according to predetermined expressions. The module for constructing a stroke contour may construct a stroke contour connecting all of the left and right points of the plurality of touchpoints using one or more Bézier curves.

The present disclosure, in another embodiment, relates to a method for applying vector-based texturing to free-form digital input. The method may include receiving free-form digital input through a touch-based display screen, performing vector analysis on the free-form digital input, including an analysis to provide vector-based texturing to the free-form digital input, and rendering on the touch-based display screen a vector-based graphical image representative of the received input based on the vector analysis. Performing vector analysis may include calculating a width for various points along the stroke based at least in part on a speed at which the stroke was made across the touch-based display screen. Performing vector analysis may include constructing a stroke contour based on a stroke skeleton for the stroke by determining, for each of a plurality of strokepoints along the stroke, a corresponding left point $L_i$ some distance away from the stroke skeleton on a first side of the stroke skeleton and a corresponding right point $R_i$ some distance away from the stroke skeleton on a second side of the stroke skeleton and constructing a stroke contour connecting all of the left and right points of the plurality of strokepoints. The distance that the left point and right point corresponding to a given strokepoint are away from the stroke skeleton may be based at least in part on a stroke width calculated for that strokepoint based at least in part on the speed of the stroke at that strokepoint. In some embodiments, the left and right points for each strokepoint in a sequence of strokepoints may be determined according to predetermined expressions.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous systems and methods for vector texturing for free-form drawing. Particularly, the present disclosure relates to novel and advantageous systems and methods for applying a vector texture to free-form drawing, writing, etc., and more particularly, for rendering a vector texture to touch-based, free-form drawing, writing, etc.

For purposes of this disclosure, any system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a personal computer (e.g., desktop or laptop), tablet computer, mobile device (e.g., personal digital assistant (PDA) or smart phone), server (e.g., blade server or rack server), a network storage device, or any other suitable device or combination of devices and may vary in size, shape, performance, functionality, and price. A system may include random access memory (RAM), one or more processing resources such as a central processing unit (CPU) or hardware or software control logic, ROM, and/or other types of nonvolatile memory. Additional components of a system may include one or more disk drives or one or more mass storage devices, one or more network ports for communicating with external devices as well as various input and output (I/O) devices, such as a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, or any combination of storage devices. A system may include what is referred to as a user interface, which may generally include a display, mouse or other cursor control device, keyboard, button, touchpad, touch screen, microphone, camera, video recorder, speaker, LED, light, joystick, switch, buzzer, bell, and/or other user input/output device for communicating with one or more users or for entering information into the system. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices. A system may also include one or more buses operable to transmit communications between the various hardware components.

One or more programs or applications, such as a web browser or a so-called "app," and/or other applications may be stored in one or more of the system data storage devices. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information.

Hardware and software components of the present disclosure, as discussed herein, may be integral portions of a single device, computer, or server or may be connected parts of a computer network. The hardware and software components may be located within a single location or, in other embodiments, portions of the hardware and software components may be divided among a plurality of locations and connected directly or through a global computer information network, such as the Internet or other telecommunications network.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, JavaScript, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

Generally, the various embodiments of the present disclosure permit vector texturing for free-form drawing. For example, the various embodiments of the present disclosure produce texturing effects to free-form drawing using electronic or virtual utensils, such as but not limited to, virtual pens, pencils, paintbrushes, calligraphy pens, and the like, so as to generally render lines, shapes, or other drawing marks made by such virtual utensils appear generally the same as or similar to those same lines, shapes, or other drawing marks would appear utilizing a real-life version of the utensil on a physical medium, such as paper. The various embodiments of the present disclosure may be particularly useful with, although are not limited to use with, handheld electronic processing devices, such as portable computers (e.g., laptop), mobile tablet devices, and smartphones having touch-screen capabilities activated by touch via, for example, a user's finger(s) or a stylus or other like device.

One embodiment, for texturing free-form drawing is with pixel-based graphics or bitmap graphics, utilizing a series of semi-transparent bitmaps drawn or rendered in a specified and combined order so as to create the same look and effect of real-life ink, graphite, paint, etc. on a physical medium, such as paper. While such an embodiment can theoretically provide decent texturing, the actual implementation of such combined bitmaps may have drawbacks. For example, the free-form drawing may not look real enough, and it may be difficult for a user to see the actual effect of the texturizing, such as the correlation between the speed of writing and the thickness of the stroke. Additionally, the performance may be affected due to the use of excessive amounts of bitmap drawing. Still further, as described above, pixel-based graphics or bitmap graphics do not scale to a larger size very well, and result in a distorted and/or splotchy image of poor quality.

Accordingly, other embodiments of the present disclosure utilize vector graphics, or geometrical primitives, such as points, lines, curves, and shapes or polygons representing images based on mathematical expressions or functions. Unlike pixel graphics, vector graphics are more easily scalable to any size without losing quality, since the image changes size through geometrical equations. Performance is an additional advantage realized in texturizing with vector graphics.

In order to accomplish the described texturing, the various embodiments of the present invention may employ one or more modules or interfaces for receiving free-form input, performing vector analysis, and rendering a vector-based graphical image representative of the received input. The various example modules or interfaces may be provided as hardware and/or software components, and in one embodiment may be provided as a web-based application or a mobile app. Certain modules or interfaces may be configured for use with generally any electronic or other processing device, and may particularly be configured for access from, or download and use from, a mobile device, such as but not limited to a smartphone, tablet device, and the like, in conventional manners, such as by access through a web browser or by download and install from an "app store." The various example modules or interfaces of the present disclosure may be utilized as a stand-alone application. However, in many embodiments, the various example modules or interfaces of the present disclosure may be utilized by, accessed by, incorporated into, etc., any suitable end product utilizing graphics, such as but not limited to, a drawing application, note-taking application or other productivity application, etc. in order to provide higher quality vector graphics.

The various embodiments of the present disclosure may include or be communicatively coupled with an input module for receiving input strokes from a user, such as input touch-based strokes from a user. As described above, the various embodiments of the present disclosure may be particularly useful with, although are not limited to use with, electronic processing devices, such as computers, desktop or laptop, mobile tablet devices, and smartphones having touch-screen capabilities activated by touch via, for example, a user's finger(s) or a stylus or other like device. Accordingly, the various embodiments of the present disclosure may employ existing hardware and/or software components, such as a touch screen, processor, etc., of such devices to receive and (initially) process touch-based input from the user. In other embodiments, appropriate hardware and/or software components, such as any of those described in detail above, may be specifically designed and configured for receiving and processing a user's touch-based input and preparing the input data for other modules of the present disclosure, described in further detail below.

Figure 1A:
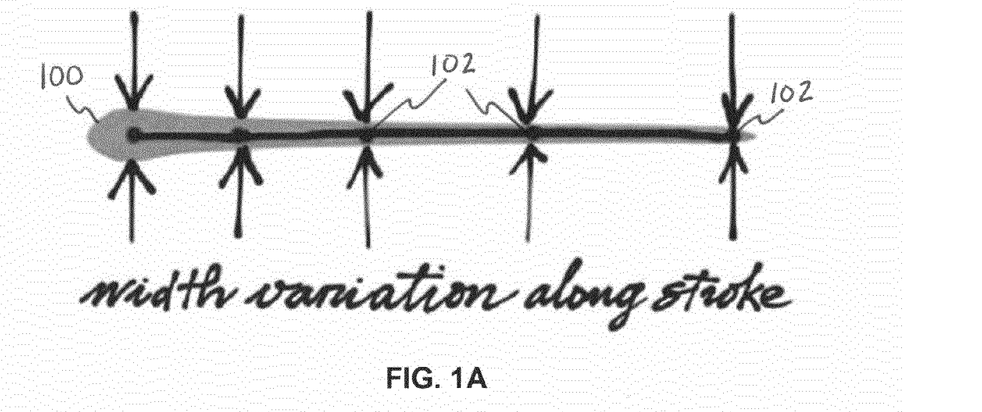
FIG. 1A is a graphical representation of an example stroke written as the user's touch speed increased as the user wrote from left to right, in accordance with an embodiment of the present disclosure.

In one embodiment, a stroke width module may be provided for determining and/or calculating a stroke width for the input. Specifically, one aspect of real-life writing/drawing (e.g., with a pen on paper) is the speed at which the writing is performed. Generally, the faster a user writes, the thinner the stroke should be, and vice versa. It can thus be desirable to incorporate the speed of writing into the determination and construction of the stroke output. FIG. 1A illustrates an example stroke 100 written as the user's touch speed increased as the user wrote from left to right.

In one embodiment, the stroke width module may make use of existing functionality provided by the electronic device or operating system of the mobile device to measure current stroke or touch speed. For example, on a device running the iOS operating system, the UIPanGestureRecognizer::velocityInView function may be used to obtain measurements of the user's current touch speed. Of course, this is but one example of an existing function that may be utilized, and iOS or other operating systems may include any number of functions capable for determining a user's current touch speed.

In other embodiments, the stroke or touch speed may be interpolated or estimated from other obtainable information. For example, in one embodiment, illustrated in FIG. 1A, the speed may be interpolated or estimated based on the distance between touchpoints 102 taken or measured at specified time intervals, where the general assumption is that the further any two consecutive touchpoints are apart from each other, the faster the user's touch speed between those consecutive touchpoints. Such an estimate can provide a fair reflection of the actual writing speed.

More particularly, in one embodiment, given a sequence or array of touchpoints 102 taken or measured at specified time intervals, stroke width at a given touchpoint may be defined as a function receiving as an input parameter, the distance between that point and its predecessor touchpoint. Any function for stroke width calculation may be used, and of course may be based on a variety of factors, such as but not limited to, the user's electronic device capabilities or other characteristics, the device operating system, the type of virtual utensil used and the variable settings therefor, etc. In one particular embodiment, the function for determining or calculating the stroke width for each touchpoint in a sequence of touchpoints may including an arctan, or a tan, function and may be determined using the following expressions:

$$\text{currentLength} = \text{self.strokeWidth} / \text{distanceBetweenPoints}(\&\text{points}[i], \&\text{points}[i-1]) \quad 1)$$

$$\text{strokeWidths}[i] = \text{self.strokeWidth} * a\tan(\text{currentLength}) \quad 2)$$

where points[ ] is an array storing the sequence of touchpoints, i is the current touchpoint, i−1 is the predecessor touchpoint, distanceBetweenPoints is a function for determining the distance between two points, received as input parameters, self.strokeWidth is a normalized thickness corresponding to a pre-selected or predetermined thickness, such as a stroke thickness selected by the user, and strokeWidth[i] is the calculated stroke width for touchpoint i and reflects the estimated user's touch speed. Specifically, from the above expressions, the stroke width at touchpoint i is computed as the arctan of the distance between touchpoint i and the previous touchpoint, normalized to the pre-selected or predetermined thickness, self.strokeWidth, as all widths along a stroke should desirably be proportional to the pre-selected or predetermined thickness.

Figure 1B:
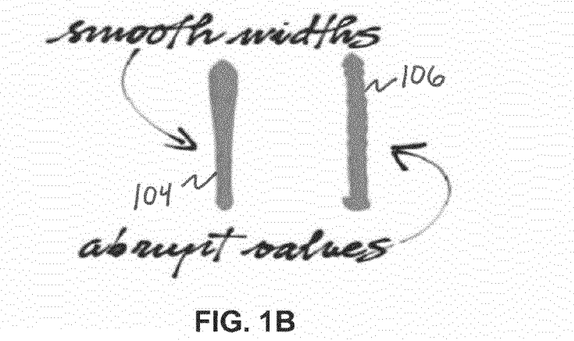
FIG. 1B is a graphical representation of a stroke rendered from generally "continuous" values, in accordance with an embodiment of the present disclosure, and a stroke rendered from generally non-continuous values, resulting in abrupt changes in the stroke width.

While the calculation of the stroke width is not limited to an arctan function, an advantage of the a tan function is that it produces generally "continuous" values. It can be desirable to have a touchpoint array of "continuous" entries, so that in a subsequent construction or rendering stage of the stroke, the stroke contour would look smooth, with gradual changes from thin to thick and vice versa. If the function did not produce generally continuous values, there could be undesirable abrupt changes in the contour path, as illustrated in FIG. 1B, which shows a stroke 104 rendered from generally "continuous" values on the left and a stroke 106 rendered from generally non-continuous values on the right, resulting in abrupt changes in the stroke.

At relatively slow speeds, abrupt values may still occur when utilizing an arctan function. However, in applications relating to writing or other free-form drawing, this can be acceptable since the same general behavior may occur with real-life ink, paint, or the like on paper, e.g., very slow motion could result in extra ink at some points on the paper surface. In other embodiments, however, additional smoothing of the stroke may be used to reduce or eliminate any abrupt changes.

Figure 1C:
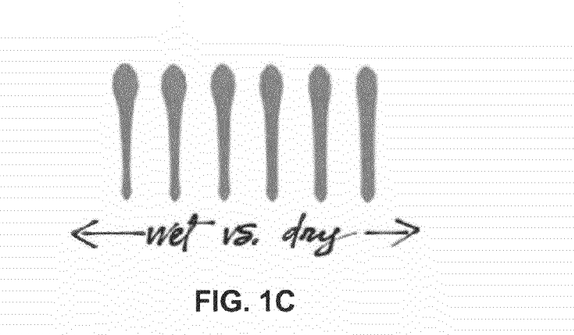
FIG. 1C is a graphical representation of example strokes written with varying levels of wetness, decreasing in wetness from left to right, in accordance with an embodiment of the present disclosure.

In another embodiment, a stroke wetness module may be provided for determining and/or calculating how "wet" a stroke is. Generally, a wetter stroke would have a broader value range of stroke widths, and a drier stroke would have a narrower value range of stroke widths. It can thus be desirable to incorporate the stroke wetness into the determination and construction of the stroke output. FIG. 1C illustrates example strokes written with varying levels of wetness, decreasing in wetness from left to right.

In one embodiment, stroke wetness may be defined as a parameter in a specified value range, such as but not limited to, a parameter in a value range of 0 to 1. The parameter may be utilized, in any suitable manner, to alter the stroke width. Specifically, the function for stroke width may be altered based on the stroke wetness parameter. While the function for stroke width may be altered in any suitable manner, which again may of course be based on a variety of factors, such as but not limited to, the user's electronic device capabilities or other characteristics, the device operating system, the type of virtual utensil used and the variable settings therefor, etc., in one particular embodiment, the above-described function for determining or calculating the stroke width for each touchpoint in a sequence of touchpoints may be altered by an exponential factor, relating to the level of wetness, to reduce or expand the magnitude of the input parameter to the arctan function, e.g., the currentLength. Specifically, the above-described function or determining or calculating the stroke width for each touchpoint in a sequence of touchpoints may be altered according to the following expression:

strokeWidths[i]=self.strokeWidth*$a$ tan(pow$f$(currentLength,wetness))     3)

where wetness is the wetness value, such as a wetness value in the range of 0 to 1.

Figure 2A:
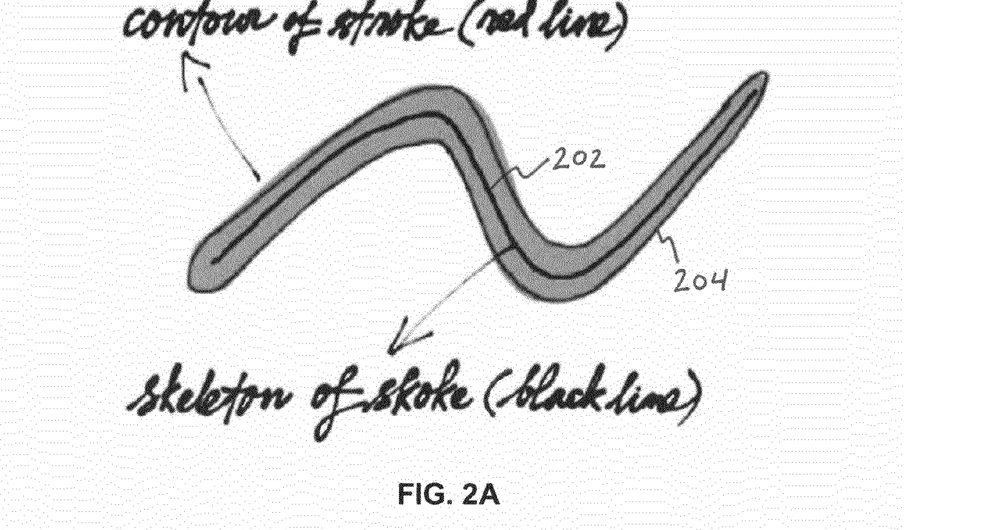
FIG. 2A is a graphical representation of a stroke construction particularly showing the stroke skeleton and the stroke contour, in accordance with an embodiment of the present disclosure.

A stroke construction module may also be provided for constructing the vector-based free-form drawing based on the input stroke from the user. The stroke construction module may include one or more functions or submodules as a part of the overall stroke construction. For example, the stroke construction module may include a submodule for constructing a stroke skeleton 202, illustrated as the center line in the example stroke of FIG. 2A, and a submodule for constructing the stroke contour 204, illustrated as the outer line in the example stroke of FIG. 2A.

Figure 2B:
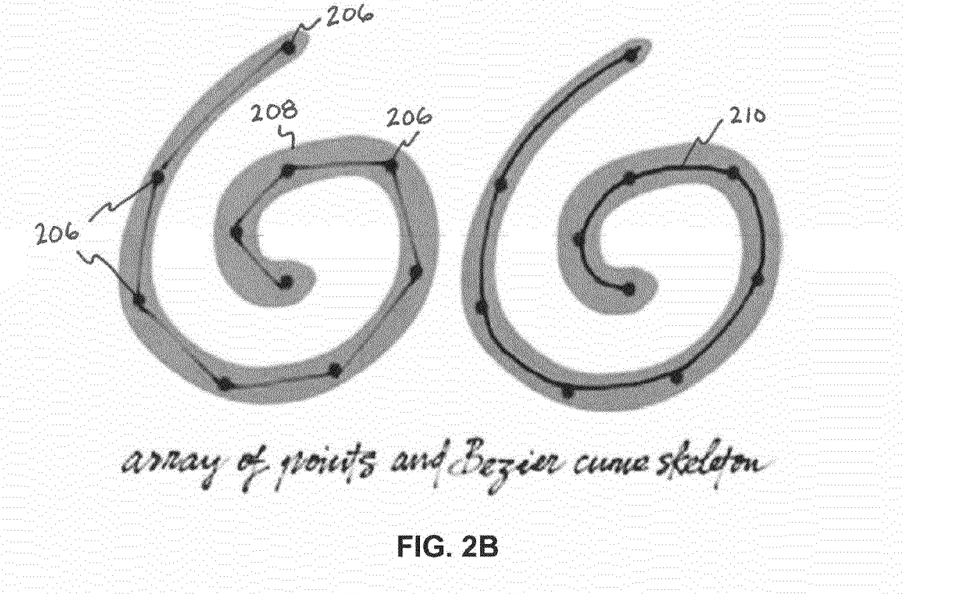
FIG. 2B is a graphical representation of a user stroke represented as a series of points along the stroke and a user stroke represented as a Bézier curve, in accordance with an embodiment of the present disclosure.

A submodule for constructing a stroke skeleton may generally construct a general shape for a stroke based on user input. Generally, a user stroke in raw input form can be broken down to a series of stroke points 206 along the stroke 208, as illustrated in the left side of FIG. 2B. Control points may be generated for a Bézier curve to connect the stroke points into a smooth curve 210, as illustrated in the right side of FIG. 2B. Quadratic and cubic Bézier curves may be more commonly utilized, but higher order Bézier curves may also be used. Higher order Bézier curves, however, are generally more computationally expensive. If the control points define a complex stroke, lower order Bézier curves may be patched together, producing a Bézier spline. In one embodiment, as one moves along the stroke from the first point to the endpoint, the current heading direction at any given stroke point i may be expressed by the vector: strokepoint$_i$−strokepoint$_{i-1}$. For a Bézier curve, the direction vector (or the tangent vector to the curve at point i) may be expressed as the vector: strokepoint$_i$−controlpoint$_{i-1}$. In some embodiments, the function for calculating Bézier curve control points may use thread-specific buffers, such as thread-specific, fix-sized, static buffers, which may be pre-allocated for each thread so that the computation is faster. At any rate, the Bézier curve or spline may serve as the skeleton of the input stroke.

A submodule for constructing the stroke contour may be utilized to define the contour path of the stroke from the stroke skeleton, thereby defining a body of the stroke. In a general sense, in one embodiment, the contour path may be generated by going through each stroke point i of the stroke and computing a corresponding left point $L_i$, at some predetermined distance away from the stroke skeleton on the left side thereof, and a right point $R_i$, at some predetermined distance away from the stroke skeleton on the right side thereof. The predetermined distance may, in one embodiment, be based on the calculated stroke width, as described above. The left and right points may then be used to trace a stroke contour and define a body of the stroke.

Figure 3A:
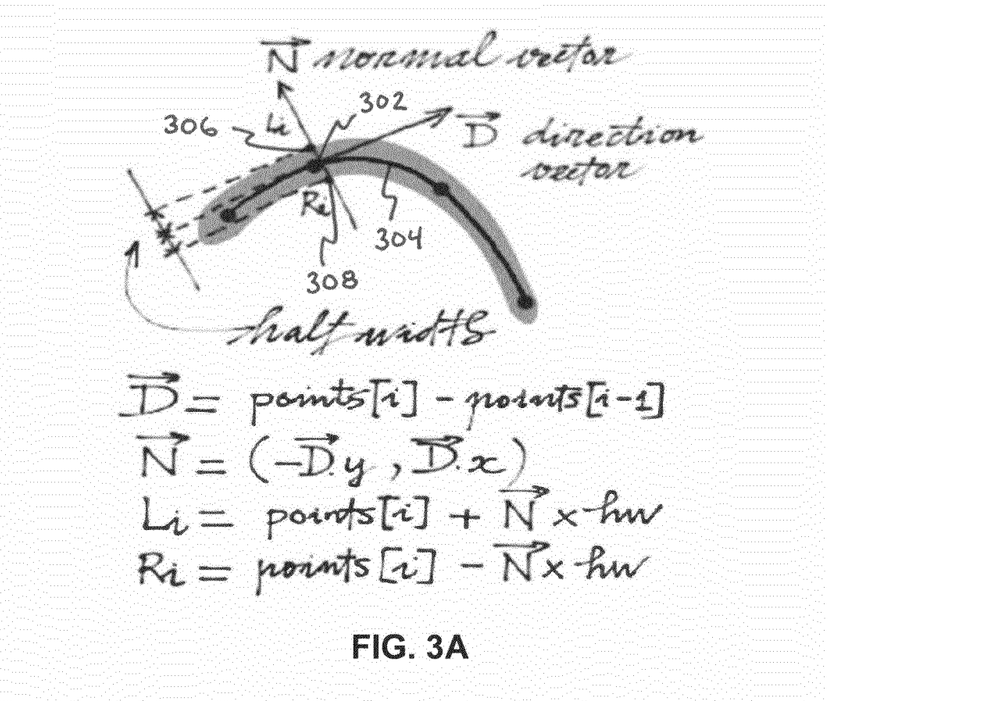
FIG. 3A is a graphical representation of the computation of a stroke contour, in accordance with an embodiment of the present disclosure.

More particularly, in one particular embodiment illustrated in FIG. 3A, for any given stroke point i 302 of the stroke skeleton 304, the left 306 and right 308 points may be computed based on the perpendicular vector, or normal vector, to the current direction vector for stroke point i, described above, and the stroke width calculated for stroke point i. The left 306 and right 308 points, in one embodiment, could be positioned a distance that is at, or about, half of the stroke width from, and in a direction perpendicular to, the current direction vector, with the left and right points on opposite sides of the stroke skeleton from one another. In one embodiment, the calculation of the left and right points may be determined using the following general expressions:

$\vec{D}$ =strokepoints[i]−strokepoints[i−1]     4)

$\vec{N}$ =(−$\vec{D}_y$, $\vec{D}_x$)     5)

$L_i$=strokepoints[i]+$\vec{N}$ *$hw$     6)

$R_i$=strokepoints[i]−$\vec{N}$ *$hw$     7)

where strokepoints[ ] is an array storing the sequence of stroke points, i is the current stroke point, i−1 is the predecessor stroke point, $\vec{D}$ is the direction vector, $\vec{N}$ is the perpendicular vector or normal vector, and hw is equal to half of the stroke width, as determined or calculated, for example, as described above. However, hw could be any other predetermined or preselected distance, as may be desirable for a given application or effect, and is not limited to simply half of the stroke width.

Figure 3B:
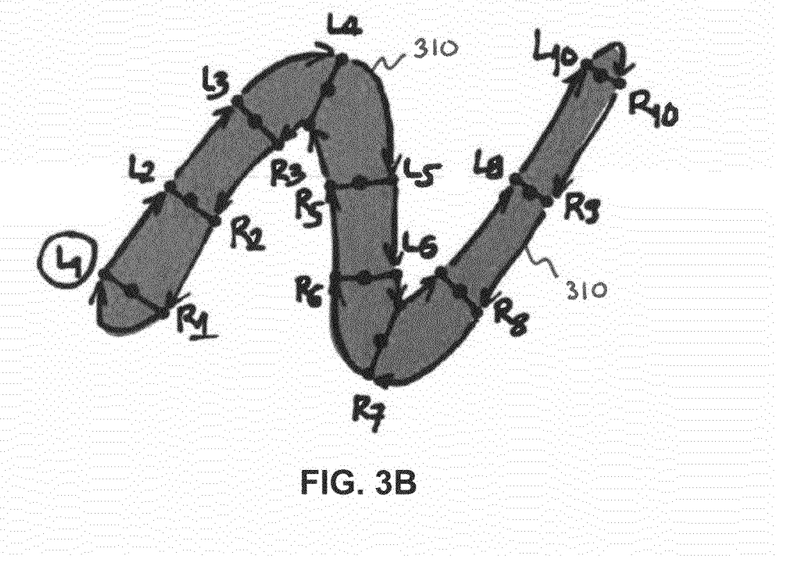
FIG. 3B is a graphical representation of the construction of a contour path representing a stroke utilizing the calculated left and right points, in accordance with an embodiment of the present disclosure.

After the left and right points are computed for the stroke points, the contour path 310 or contour graphics path that will represent the stroke may be constructed utilizing the left and right points, as shown in FIG. 3B. In general, the contour path 310 may be constructed by connecting sequential left points and sequential right points to form a closed loop around the stroke skeleton. Any method for connecting sequential left and right points may be used. In one particular embodiment, the contour path 310 may be constructed by starting at a given left or right point, using a Bézier curve to connect that point with the next sequential point, using another Bézier curve to connect the second point with the next sequential point after that, and continuing the process until a closed loop is formed around the stroke skeleton. As may be appreciated, the first left point may be connected with the first right point, and the last left point may be connected with the last right point, in order to form the closed loop. For example only, in one embodiment, the contour path 310 may be constructed, as illustrated in FIG. 3B, by initially selecting a starting left or right point. While any left or right point may be used as the starting point, for ease of discussion, left point 1 ($L_1$) has been selected herein as the starting point. $L_1$ may be connected with the next sequential left point ($L_2$) using a Bézier curve. As described above, quadratic and cubic Bézier curves may be more commonly utilized, but higher order Bézier curves may also be used. Higher order Bézier curves, however, are generally more computationally expensive. $L_2$ may be connected with the left point following it sequentially ($L_3$) also using a Bézier curve. This may be repeated until the last left point is reached, that being $L_{10}$ in the example stroke in FIG. 3B; however, for any given stroke there may be more or less than ten left points. The last left point, $L_{10}$, may be connected with the right point that was calculated for the same stroke point as the last left point, which in the case of the example stroke in FIG. 3B is last right point $R_{10}$. $L_{10}$ may be connected with $R_{10}$ using a Bézier curve. Working down the right side, $R_{10}$ may be connected with the next right point sequentially following it in the reverse direction ($R_9$) also using a Bézier curve. This may be repeated until the last right point in the reverse direction is reached, that being $R_1$ in the example stroke in FIG. 3B; however, for any given stroke there may be more or less than ten right points. $R_1$ may be connected with $L_1$ using another Bézier curve to complete the contour path and close the loop. While one embodiment using Bézier curves has been described, in other embodiments, other methods of connecting two points may be utilized, and the present disclosure is not limited to the use of only Bézier curves. Likewise, any combination of methods for connecting two points may be utilized.

In one particular embodiment, a cubic Bézier curve or spline may be used to construct the stroke skeleton, since a cubic Bézier curve will typically be smoother and will result in a nicer looking stroke output. A quadratic Bézier curve or spline may be used to connect the left points and right points together to form the stroke contour, since quadratic Bézier curve control points are typically simpler and faster to compute.

At this point, the result of the above steps is a graphics path (e.g., generally a mathematical description of a series of shapes or lines) that, in some embodiments, may be used with standard computer graphics functions, such as but not limited to CGContextFillPath, CGContextStrokePath, and the like, in order to render the stroke. Accordingly, similar to the input module, the various embodiments of the present disclosure may include or be communicatively coupled with an output module for outputting the rendered stroke with the calculated effects using vector-based graphics. As described above, the various embodiments of the present disclosure may be particularly useful with, although are not limited to use with, electronic processing devices, such as computers, desktop or laptop, mobile tablet devices, and smartphones having touch-screen capabilities activated by touch via, for example, a user's finger(s) or a stylus or other like device. Accordingly, the various embodiments of the present disclosure may employ existing hardware and/or software components, such as a display screen, processor, etc., of such devices to display the stroke to the user. In other embodiments, appropriate hardware and/or software components, such as any of those described in detail above, may be specifically designed and configured for displaying the stroke to the user. While not limited to such an embodiment, in one embodiment, the stroke may be displayed to the user substantially as the user is, or substantially immediately after the user has, provided the input stroke, thereby appearing to the user as happening in generally "real-time."

Some embodiments of the present disclosure may further include one or more modules for mimicking particular utensil types or medium types, such as but not limited to various types of pens or inks, pencils, various types of paintbrushes or paints, calligraphy pens, charcoal, crayon, marker, and the like. For example, in one embodiment, the stroke construction module described above may be used to generally mimic the look and effect of a real-life free-form drawing created with, for example, a ball-point pen on paper or other physical medium. While described herein as mimicking a ball-point pen, it is understood that changing characteristics of the stroke, such as but not limited to, the stroke width and stroke wetness, may change the appearance of the stroke, and in some embodiments to an extent that it no longer resembles a ball-point pen. For example, increasing the stroke wetness could result in a stroke having more of an appearance resembling that of a real-life stroke from a Chinese round brush. Nonetheless, such embodiments are intended to fall within the scope of the present disclosure, and the label "ball-point pen" is not intended to be limiting.

For other types of utensils or mediums, a module may be provided for modifying the stroke construction described above to achieve varying effects with the intention of mimicking such other utensil types or medium types. For example, a "fountain pen" module may be provided that modifies the stroke construction with the intention of mimicking the effect of writing with a real-life fountain pen or similar instrument. Again, while labeled herein as a fountain pen module, it is understood that changing characteristics of the stroke, such as but not limited to, the stroke width and stroke wetness, may change the appearance of the stroke, and in some embodiments to an extent that it no longer resembles a fountain pen. Likewise, while having the intention of mimicking some of the effects of a fountain pen, the fountain pen module need not necessarily exactly, or even closely, resemble a stroke made by a real-life fountain pen. Rather, the label provided herein (e.g., "fountain pen" module) is simply for ease of reference, and does not necessarily infer the exact result obtained from the module.

In the above-described stroke construction, the vector $L_i R_i$, formed by the corresponding left and right points, is "omni-directional," in that it can point, or rotate, to any direction as it follows along the stroke skeleton. This is somewhat different to how a real-life fountain pen works, in which the fountain pen nib is placed on a paper (or other medium) surface at an angle and generally is not rotated very much during the process of writing.

Figure 4:
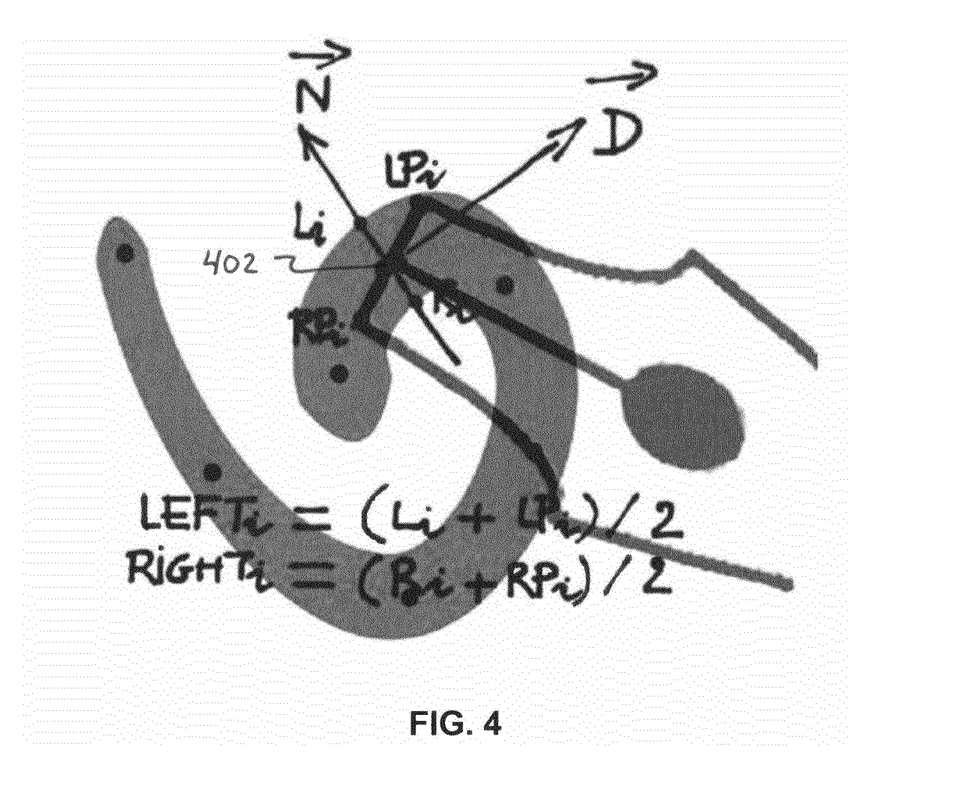
FIG. 4 is a graphical representation of approximating the effect of a conventional fountain pen style, in accordance with one embodiment of the present disclosure.

To account for this difference between a fountain pen and, for example, a ball-point pen, as an initial step, a fountain pen nib angle may be selected to represent the angle at which the virtual pen nib is placed and maintained on the paper. While any suitable angle may be used, in one embodiment, an angle of 45 degrees may be selected, or may be configured as a default angle but optionally changeable, for example, by a user. The following description and accompanying figure presume a 45 degree angle for a right-handed user, but as described above, any angle may be utilized. In this regard, as illustrated in FIG. 4, because the virtual pen nib is maintained at a 45 degree angle, the left point of the virtual pen nib $LP_i$ will always lie in a position that is above and to the right (e.g., in a northeastern direction) from the stroke point i and the right point of the virtual pen nib $RP_i$ will always lie in a position that is down and to the left (e.g., in a southwestern direction) from the stroke point i 402. In one embodiment, to add the effect of the pen nib angle to the stroke contour construction, the calculation of the left and right points used for stroke contour construction may be modified. In particular, in one embodiment, the modified left and right points, herein referred to as $LEFT_i$ and $RIGHT_i$, may be calculated as the average of the left and right points, $L_i$ and $R_i$, as computed above, and the pen nib's left and right points, $LP_i$ and $RP_i$. Accordingly, in one embodiment, the calculation of the modified left and right points may be determined using the following general expressions:

$$LEFT_i=(L_i+LP_i)/2 \qquad (8)$$

$$RIGHT_i=(R_i+RP_i)/2. \qquad (9)$$

The stroke contour can then be constructed as described above, connecting the modified left and right points, $LEFT_i$ and $RIGHT_i$, rather than the initially computed left and right points in order to define the stroke body.

As another example, a "calligraphy pen" module may be provided that modifies the stroke construction with the intention of mimicking the effect of writing with a conventional, real-life calligraphy pen or similar instrument. Again, while labeled herein as a calligraphy pen module, it is understood that changing characteristics of the stroke, such as but not limited to, the stroke width and stroke wetness, may change the appearance of the stroke, and in some embodiments to an extent that it no longer resembles a calligraphy pen. Likewise, while having the intention of mimicking some of the effects of a conventional calligraphy pen, the calligraphy pen module need not necessarily exactly, or even closely, resemble a stroke made by all or any type of calligraphy pen nor made in all or any type of calligraphy style. Rather, the label provided herein (e.g., "calligraphy pen" module) is simply for ease of reference, and does not necessarily infer the exact result obtained from the module.

Figure 5A:
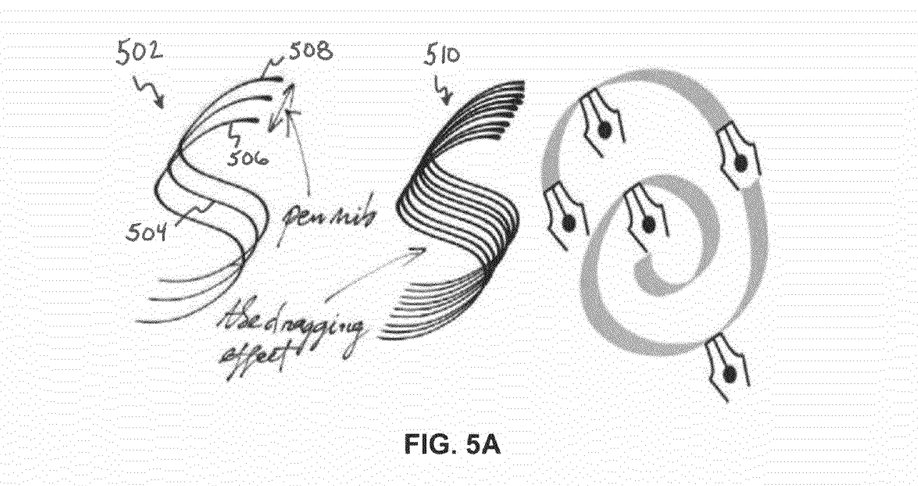
FIG. 5A is a graphical representation of the effect of offset curves for a conventional calligraphy pen style.

As can be understood from the foregoing, the pen nib of a pen is a physical object having dimension. Unlike a ball-point pen, a conventional calligraphy pen is not typically representable by a simple point. For simplicity, however, in one embodiment, we may represent or approximate a conventional calligraphy pen nib, like the fountain pen nib, as a line segment, generally representing the contacting surface of the pen nib on paper from the left tip, LP, to the right tip, RP. Similar to the fountain pen, in at least one conventional calligraphy style, a conventional calligraphy pen nib is placed on a paper (or other medium) surface at an angle and generally is not rotated very much during the process of writing. Rather, the calligraphy pen may be "dragged" across the paper at the generally fixed angle to create a stylistic effect. FIG. 5A illustrates the effect of dragging a conventional calligraphy pen nib across the paper. In the image 502 on the left of FIG. 5A, the middle curve 504 may represent the moving path of the calligraphy pen nib, the outer curves 506, 508 are created by the left and right tips, LP and RP, of the pen nib, under the assumption that the pen nib may be approximated by a line segment fixed at a predetermined or pre-selected angle, from LP to RP, as described above. The "dragging," in a conventional calligraphy style, may result in the three line segments being substantially equal, but offset from one another. This result is further magnified by the middle image 510 of FIG. 5A, where additional curves have been introduced to illustrate the equal, but offset effect. Any angle may be selected to represent the angle at which the virtual calligraphy pen nib is placed and maintained on the paper, and while any suitable angle may be used, in one embodiment, an angle of 45 degrees may be selected, or may be configured as a default angle but optionally changeable, for example, by a user.

In one embodiment, the offsetting effect, or dragging effect, of the curves may be determined using Minkowski sums. However, the complexity of Minkowski sums, in some embodiments, could impair the ability to calculate and display the stroke quickly enough to emulate real-time writing, and thus hinder performance.

Figure 5B:
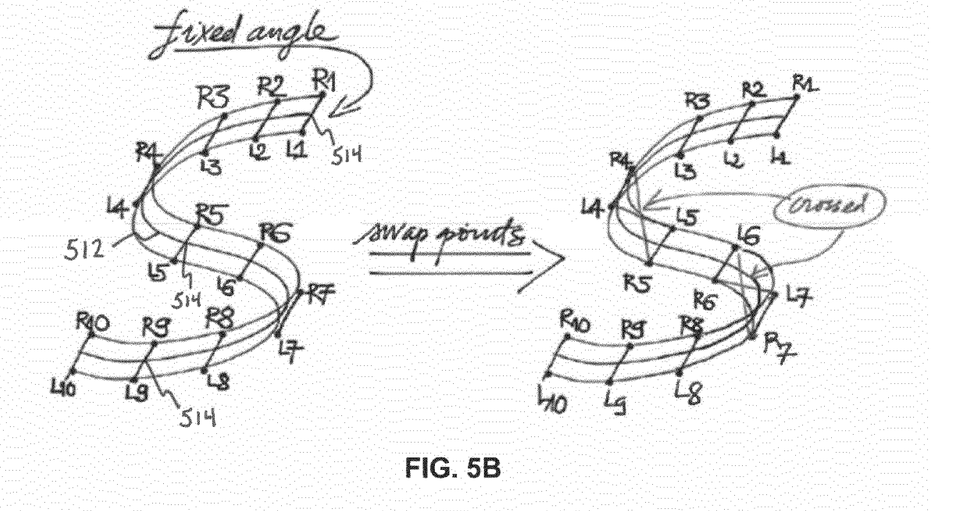
FIGS. 5B and 5C are graphical representations of approximating the effect of offset curves for a conventional calligraphy pen style, in accordance with one embodiment of the present disclosure.
Figure 5C:
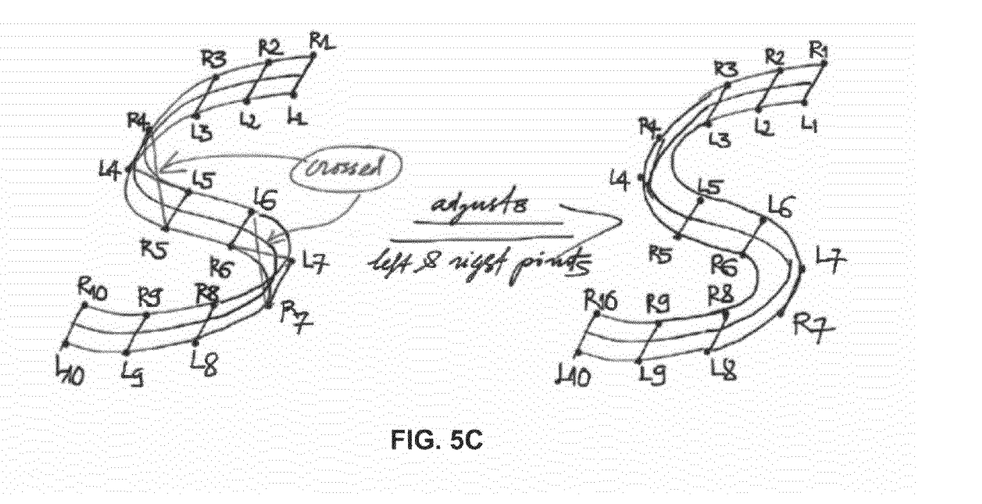

Accordingly, in other embodiments, the Minkowski sum, and thus the offsetting effect created by a conventional calligraphy pen, may be approximated. FIGS. 5B and 5C illustrate one embodiment for approximating the effect of offset curves. The left side of FIG. 5B illustrates a stroke skeleton (middle curve) 512, bounded by left and right points, $L_{1-10}$ and $R_{1-10}$. Each of the left points, $L_{1-10}$, may be determined as the position of the left tip of the virtual calligraphy pen corresponding to each point i 514 along the stroke skeleton 512, and each of the right points, $R_{1-10}$, represent the position of the right tip of the virtual calligraphy pen corresponding to each point i along the stroke skeleton. In one embodiment, the distance between any corresponding pair of left and right points, $L_i$ and $R_i$, may be equal to, or determined based on, the stroke width for point i, as determined or calculated, for example, as described above. However, any other predetermined or preselected distance, as may be desirable for a given application or effect, may be utilized and is not limited to the stroke width. As can be seen from the left side of FIG. 5B, each vector $L_iR_i$ is not necessarily, and in many cases is not, perpendicular to the current direction vector between point i and point i–1. Instead, the vector $L_iR_i$ has a fixed direction based on the pen nib angle.

As may also be seen from the left side of FIG. 5B, because the vectors $L_iR_i$ are not necessarily perpendicular to the current direction vector, depending on the stroke path, some left points and/or some right points may not necessarily fall on the true left/right side of the current direction vectors. In a first pass, according to one algorithm of the present disclosure, each of the left points $L_i$ and right points $R_i$ can be scanned to check or determine if they are truly on the left or right side, respectively, of the current direction vector for point i along the stroke skeleton 512, and where they are not, the left and right points at point i may be swapped. For example, in FIG. 5B, the left point $L_5$ has been swapped with the right point $R_5$ to maintain the condition that $L_5$ is on the left side, and $R_5$ is on the right side, of the current direction vector for point 5. The pairs $L_6R_6$ and $L_7R_7$ are also swapped for the like reasons.

Normally (i.e., prior to the swap), any two vectors $L_iL_{i+1}$ and $R_iR_{i+1}$ will form two parallel edges of a parallelogram.

However, swapping left and right points may instead create crossing vectors along the stroke skeleton 512. For example, as illustrated in the right side of FIG. 5B, vectors $L_4L_5$ and $R_4R_5$ cross. So do vectors $L_6L_7$ and $R_6R_7$. This condition may be referred to herein as a "cross" condition. In a second pass, according to one algorithm of the present disclosure, illustrated in FIG. 5C, these cross conditions may be identified and utilized to determine whether a given left point should be removed from the left contour path and added to the right contour path and/or whether a given right point should be removed from the right contour path and added to the left contour path. In one embodiment, the result is that essentially all points (after the swap) on the left side of the stroke skeleton 512, regardless of designation as a left point or a right point, may be connected to form the left side of the contour path while essentially all points (after the swap) on the right side of the stroke skeleton, regardless of designation as a left point or a right point, may be connected to form the right side of the contour path. For example, as illustrated in the right side of FIG. 5C, where $L_4L_5$ and $R_4R_5$ cross, the right side of the contour path may include $R_4$, $L_4$, and $R_5$ while the left side of the contour path may include only $L_3$ and $L_5$. Likewise, where $L_6L_7$ and $R_6R_7$ cross, the left side of the contour path may include $L_6$, $L_7$, and $R_7$ while the right side of the contour path may include only $R_6$ and $R_8$.

In some embodiments, there may be multiple cross conditions identified or determined, and in some cases, the cross conditions may be consecutive. Additionally, the identification or determination of a cross condition may depend on one or more previously identified cross conditions.

With respect to the example stroke of FIGS. 5B and 5C, after the above-described algorithmic passes, the right curve (i.e., beginning at point $R_1$) includes the following points: $R_1$, $R_2$, $R_3$, $R_4$, $L_4$, $R_5$, $R_6$, $R_8$, $R_9$, and $R_{10}$ while the left curve (i.e., beginning at point $L_1$) includes the following points: $L_1$, $L_2$, $L_3$, $L_5$, $L_6$, $L_7$, $R_7$, $L_8$, $L_9$, and $L_{10}$. The stroke contour may be constructed from the two contour parts (i.e., the left and right parts) as described above with respect to FIG. 3B.

Any other number of utensil or medium module may be provided that modifies the stroke construction with the intention of mimicking the effect of writing with a real-life version of the instrument or medium, and the modules are not limited to only a ball-point pen module, fountain pen module, or calligraphy pen module. For example, any number of modules for mimicking other utensils or mediums, such as but not limited to, various types of pens or inks, pencils, various types of paintbrushes or paints, charcoal, crayon, marker, and the like, may be provided.

While discussed as separate modules herein, it is recognized that in other embodiments, any of the modules described herein, in any combination, may be combined as a single module or multiple modules in different configurations than described herein. Any additional modules or functionality may further be included. Likewise, not every module described herein is required in every embodiment.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A system for applying vector-based texturing to free-form digital input, the system comprising:
    an input interface for receiving free-form digital input relating to a stroke across a touch-based display screen of a user's finger or a stylus device;
    a module for performing vector analysis on the free-form digital input, the module for performing vector analysis comprising a stroke width module for calculating a width for the stroke, wherein the width for the stroke at various touchpoints in a sequence of touchpoints taken along the stroke at predetermined time intervals is determined for each touchpoint according to the following expressions:

currentLength=self.strokeWidth/distanceBetweenPoints(&points[i],&points[i−1]);

and strokeWidths[i]=self.strokeWidth*trigFunction(currentLength);

wherein points[ ] is an array storing the sequence of touchpoints, i is the touchpoint for which stroke width is being determined, i−1 is the predecessor touchpoint, distanceBetweenPoints is a function for determining the distance between two points, received as input parameters, self.strokeWidth is a normalized thickness corresponding to a predetermined thickness, trigFunction is a trigonometric function, and strokeWidth[i] is the calculated stroke width for the touchpoint i; and
    an output interface for rendering on the touch-based display screen a vector-based graphical image representative of the received input based on the vector analysis.

2. A method for applying vector-based texturing to free-form digital input, the method comprising:
    receiving free-form digital input relating to a stroke across a touch-based display screen of a user's finger or a stylus device;
    performing vector analysis on the free-form digital input, comprising constructing a stroke contour by determining, for each touchpoint in a sequence of touchpoints along the stroke, a corresponding left point $L_i$ and a corresponding right point $R_i$ and constructing a stroke contour connecting the left and right points of the plurality of touchpoints, wherein the left and right points for each touchpoint in the sequence of touchpoints are determined according to the following expressions:

$\vec{D}$=points[i]−points[i−1];

$\vec{N}$=(−$\vec{D}$y,$\vec{D}$x);

$L_i$=points[i]+$\vec{N}$*hw; and $R_i$=points[i]−$\vec{N}$*hw wherein points[ ] is an array storing the sequence of touchpoints, i is the touchpoint for which the left $L_i$ and right $R_i$ points are being determined, i−1 is the predecessor touchpoint, $\vec{D}$ is a direction vector corresponding to touchpoint i, $\vec{N}$ is a normal vector corresponding to touchpoint i, and hw is a percentage of a stroke width determined for the stroke at touchpoint i; and rendering on the touch-based display screen a vector-based graphical image representative of the received input based on the vector analysis.

3. The method of claim 2, wherein the stroke width determined for the stroke at any given touchpoint i is based at least in part on the speed of the stroke at that touchpoint.

4. The system of claim 1, wherein the stroke width is based at least in part on a speed at which the stroke was made across the touch-based display screen.

5. A system for applying vector-based texturing to free-form digital input, the system comprising:
   an input interface for receiving free-form digital input relating to a stroke across a touch-based display screen of a user's finger or a stylus device;
   a module for performing vector analysis on the free-form digital input, the module for performing vector analysis comprising a stroke width module for calculating a width for the stroke, wherein the width for the stroke at various touchpoints in a sequence of touchpoints taken along the stroke at predetermined time intervals is determined for each touchpoint according to the following expressions:

currentLength=self.strokeWidth/distanceBetweenPoints(&points[i],&points[i−1]);

and strokeWidths[i]=self.strokeWidth*trigFunction(pow$f$(currentLength,wetness);

wherein points[ ] is an array storing the sequence of touchpoints, i is the touchpoint for which stroke width is being determined, i−1 is the predecessor touchpoint, distanceBetweenPoints is a function for determining the distance between two points, received as input parameters, self.strokeWidth is a normalized thickness corresponding to a predetermined thickness, trigFunction is a trigonometric function, wetness is a predetermined wetness value, and strokeWidth[i] is the calculated stroke width for the touchpoint i; and
   an output interface for rendering on the touch-based display screen a vector-based graphical image representative of the received input based on the vector analysis.

6. The system of claim 1, wherein trigFunction is the arctan function.

7. The system of claim 1, wherein the module for performing vector analysis further comprises a stroke wetness module for calculating how wet a rendered stroke would appear.

8. A system for applying vector-based texturing to free-form digital input, the system comprising:
   an input interface for receiving free-form digital input relating to a stroke across a touch-based display screen of a user's finger or a stylus device;
   a module for performing vector analysis on the free-form digital input, the module for performing vector analysis comprising a module for constructing a stroke contour that determines, for each touchpoint in a sequence of touchpoints along the stroke, a corresponding left point $L_i$ and a corresponding right point $R_i$ and constructs a stroke contour connecting the left and right points of the plurality of touchpoints, wherein the left and right points for each touchpoint in the sequence of touchpoints are determined according to the following expressions:

$\vec{D}$=points[i]−points[i−1];

$\vec{N}$=(−$\vec{D}y,\vec{D}x$);

$L_i$=points[i]+$\vec{N}$*hw; and $R_i$=points[i]−$\vec{N}$*hw wherein points[ ] is an array storing the sequence of touchpoints, i is the touchpoint for which the left $L_i$ and right $R_i$ points are being determined, i−1 is the predecessor touchpoint, $\vec{D}$ is a direction vector corresponding to touchpoint i, $\vec{N}$ is a normal vector corresponding to touchpoint i, and hw is a percentage of a stroke width determined for the stroke at touchpoint i; and
   an output interface for rendering on the touch-based display screen a vector-based graphical image representative of the received input based on the vector analysis.

9. The system of claim 8, wherein the stroke width determined for the stroke at any given touchpoint i is based at least in part on the speed of the stroke at that touchpoint.

10. The system of claim 8, wherein hw is half of the stroke width determined for touchpoint i.

11. The system of claim 8, wherein the module for constructing a stroke contour constructs a stroke contour connecting all of the left and right points of the plurality of touchpoints using one or more Bézier curves.

* * * * *